(12) United States Patent
Kakade et al.

(10) Patent No.: US 10,255,574 B2
(45) Date of Patent: Apr. 9, 2019

(54) SYSTEMS AND METHODS FOR BUSINESS IMPACT ANALYSIS AND DISASTER RECOVERY

(71) Applicants: Prashant Kakade, Pune (IN); Sundar B. Raman, Chennai (IN); Rohil Sharma, Jammu (IN)

(72) Inventors: Prashant Kakade, Pune (IN); Sundar B. Raman, Chennai (IN); Rohil Sharma, Jammu (IN)

( * ) Notice: Subject to any disclaimer, the term of this patent is extended or adjusted under 35 U.S.C. 154(b) by 755 days.

(21) Appl. No.: 14/421,248

(22) PCT Filed: Aug. 13, 2013

(86) PCT No.: PCT/IB2013/056614
§ 371 (c)(1),
(2) Date: Feb. 12, 2015

(87) PCT Pub. No.: WO2014/027307
PCT Pub. Date: Feb. 20, 2014

(65) Prior Publication Data
US 2015/0302326 A1    Oct. 22, 2015

(30) Foreign Application Priority Data
Aug. 14, 2012 (IN) .......................... 2366/MUM/2012

(51) Int. Cl.
*G06Q 10/06* (2012.01)
*G06Q 10/00* (2012.01)

(52) U.S. Cl.
CPC ......... *G06Q 10/0635* (2013.01); *G06Q 10/00* (2013.01)

(58) Field of Classification Search
None
See application file for complete search history.

(56) References Cited

U.S. PATENT DOCUMENTS

2002/0133737 A1* 9/2002 Novick ............... G06F 11/1464
714/4.4
2004/0064436 A1 4/2004 Breslin et al.
(Continued)

OTHER PUBLICATIONS

International Search Report dated Jan. 23, 2014 for related PCT patent app. PCT/IB2013/056614.

*Primary Examiner* — Eric W Stamber
*Assistant Examiner* — Alan Torrico-Lopez
(74) *Attorney, Agent, or Firm* — D'Ambrosio & Menon, PLLC; Usha Menon

(57) ABSTRACT

Systems and methods for business impact analysis and disaster recovery, wherein the system comprises of an input interface; business function parameters; limiting parameters associated to the said business function parameters; a tracking sub-system; an impact calculator; an operation site; and a disaster recovery site; wherein the said limiting parameters defines the limits of the said business function parameters; and wherein the said business function parameters and the said limiting parameters are entered into the system through the said input interface; and wherein the said entered business function parameters are independently or simultaneously tracked by a tracking sub-system; and wherein on occurrence of a change in business function parameters that cross the limits defined by the said limiting parameters is tracked by the said tracking sub-system and the said impact calculator calculates the impact of the change in the said business function parameters simultaneously in real time.

9 Claims, 1 Drawing Sheet

(56) References Cited

U.S. PATENT DOCUMENTS

2004/0229199 A1* 11/2004 Ashley .................... G09B 7/00
  434/323
2008/0103847 A1*  5/2008 Sayal ............... G06Q 10/06375
  705/7.37

* cited by examiner

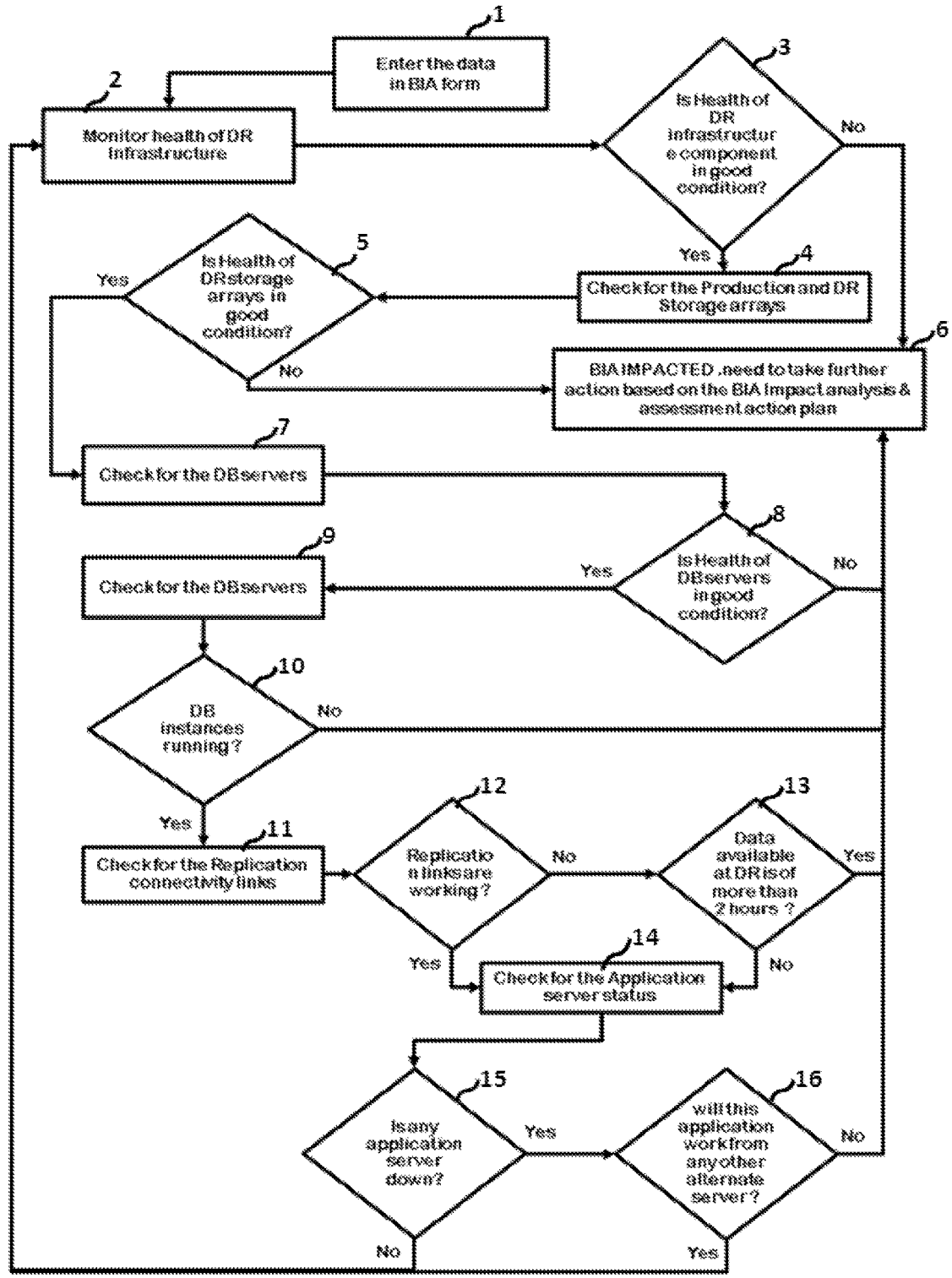

SYSTEMS AND METHODS FOR BUSINESS IMPACT ANALYSIS AND DISASTER RECOVERY

FIELD OF THE INVENTION

The present invention relates to the field of Business Impact Analysis and Disaster Recovery. More specifically the present invention relates to Business Impact Analysis and Disaster Recovery on Information Technology infrastructures.

BACKGROUND OF THE INVENTION

Business Impact Analysis (BIA) and Disaster Recovery (DR) are essential and integral part of Business continuity planning (BCP). BCP is instrumental in conducting threat analysis, defining impact scenarios and recovery requirement procedures. A business impact analysis (BIA) estimates the effects of any disturbance on one or more business function(s). BIA plays a vital role in differentiating between critical and non-critical business functions and also carries out an assessment. All the business functions or the activities are considered as critical if any change or disturbance in them cause direct an impact on the business and its stakeholders.

Today is the age of Information Technology (IT). Almost all the businesses are IT dependent and have a large amount of important data that can be considered as critical function of the business. This data is not constant but increases with time and the growth of business. Continuous availability of such business critical data and applications is very important for existence and growth of businesses. The health of business critical applications and data is dependent on the health of IT infrastructure components. Healthy IT infrastructure is the proof of healthy business critical applications and data During disaster situation, to recover vital business critical applications and data, these IT infrastructure components have to be made available at disaster recovery (DR) site with data in good conditions according to Recovery Point Objective (RPO) Service-Level Agreement (SLA). Different vendors according to their product, provide different methods to replicate or recover data at DR site. These methods require highly skilled resources to be available at DR site to execute them and take necessary actions. Also, application has to be developed and run using various IT components such as server, storage components, database, application software, etc. from various vendors and different technologies available. This is the common method followed in business activities as seen in art. Various similar methods are available to recover the site which requires large number of resources and skilled technicians. Moreover most of the disaster recovery systems available presently have maximum human interference and are not fully automated. Business Impact Analysis Systems that are available these days have to be updated time to time and such systems generate reports only once, twice or as customized in a day, but not in real time.

US patent application number US 20040064436 discloses certain aspects of business impact analysis (BIA) in real time in few of its embodiments but fails to explain automated disaster recovery. Also, Indian patent application number 3104/MUM/2010 discloses certain systems and methods involving business impact analysis (BIA) with zero Recovery Point Objective and disaster recovery in few of its embodiments but fails to overcome the distance factor.

The present invention in its various embodiments addresses the above and other possible drawbacks and limitations of the currently used systems and methods relating to the field of Business Impact Analysis and Disaster Recovery.

SUMMARY OF THE INVENTION

The present invention in a preferred embodiment provides systems and methods for business impact analysis and disaster recovery, wherein the system comprises of:
 a. an input interface;
 b. business function parameters;
 c. limiting parameters associated to the said business function parameters;
 d. a tracking sub-system;
 e. an impact calculator;
 f. an operation site; and
 g. a disaster recovery site;
 wherein the said limiting parameters defines the limits of the said business function parameters; and
 wherein the said business function parameters and the said limiting parameters are entered into the system through the said input interface; and
 wherein the said entered business function parameters are independently or simultaneously tracked by a tracking sub-system; and
 wherein on occurrence of a change in business function parameters that cross the limits defined by the said limiting parameters is tracked by the said tracking sub-system and the said impact calculator calculates the impact of the change in the said business function parameters in real time;
 and wherein the business function parameters and limiting parameters are inputted or altered by the input interface;
 and wherein the business function parameters and limiting parameters are stored in a storage device;
 and wherein the impact calculator is a computer implemented module.

BRIEF DESCRIPTION OF THE ACCOMPANYING DRAWINGS

FIG. 1 represents an exemplary flow chart of one of the embodiments of the invention.

DETAILED DESCRIPTION OF THE INVENTION

The present invention in a preferred embodiment provides systems and methods for business impact analysis and disaster recovery, wherein the system comprises of:
 a. an input interface;
 b. business function parameters;
 c. limiting parameters associated to the said business function parameters;
 d. a tracking sub-system;
 e. an impact calculator;
 f. an operation site; and
 g. a disaster recovery site;
 wherein the said limiting parameters defines the limits of the said business function parameters; and
 wherein the said business function parameters and the said limiting parameters are entered into the system through the said input interface; and
 wherein the said entered business function parameters are independently or simultaneously tracked by a tracking sub-system; and wherein on occurrence of a change in business function parameters that cross the limits defined by the said limiting parameters is tracked by the said tracking sub-system and the said impact calculator calculates the impact of the change in the said business function parameters in real time;

and wherein the business function parameters and limiting parameters are inputted or altered by the input interface;

and wherein the business function parameters and limiting parameters are stored in a storage device;

and wherein the impact calculator is a computer implemented module.

In an embodiment of the invention, the distance between a disaster recovery site and an operation site maybe any suitable distance.

In an embodiment of the invention, a limiting parameter of a business function parameter can be an upper limit, a lower limit or the combination of both, or a limiting parameter may also have a fixed value.

In an embodiment of the invention, an input interface can be accessed remotely form any suitable distance.

In an embodiment of the invention, a tracking sub-system creates event rules based an algorithm and comparison matrix to trigger the impact calculator.

In an embodiment of the invention, a business function parameter can any be any suitable business function parameter such as but not limited to total revenue, number of employees, number of customers, capital available, total liquid cash available, plan development costs, PC business recovery software costs, subscription costs for recovery processing, declaration fees, usage fees, testing, temporary location costs, administrative time, management time, redundancy costs, prevention or preparation costs, insurance costs, consulting costs, relocation costs, travel expenses, or any other combination thereof.

In an embodiment of the invention, an impact calculator calculates an impact on any suitable business factor such as but not limited to customer service, noncompliance with government regulations, noncompliance with existing contracts, increase in personnel requirements, loss of revenue, loss of business, increased operating costs, penalties, loss of financial management capability, loss of competitive edge, loss of goodwill, negative media coverage, loss of stockholder confidence, legal actions, or any combination thereof.

Another embodiment of the invention provides a method for business impact analysis and disaster recovery, wherein the method comprises steps of:
 a) entering business function parameters and limiting parameters of the said business function parameters through an input interface;
 b) tracking the said entered business function parameters for any change in the said business function parameters by a tracking sub-system;
 c) calculating the impact by an impact calculator of a change in the said business function parameters if the said business function parameters cross the limits defined by the said limiting parameters; and
 d) conducting a business impact analysis in real time and generating a business impact analysis report based on factors such as but not limited to said business function parameters, change occurred, impact calculation calculated by the said impact calculators, or any other combinations thereof.

In an embodiment of the invention, the method for business impact analysis and disaster recovery, further comprises the step of automating a disaster recovery procedure by collecting of data from the step of conducting a business impact analysis in real time and generating a business impact analysis report and feeding said data as in-bound dependencies and out-bound dependencies, down-time that a specific application can afford and impact of non-availability of application, based on which the automating a disaster recovery procedure is enabled by a disaster recovery automating engine.

Another preferred embodiment of the invention provides a computer program product for business impact analysis and disaster recovery, the computer program product embodied in a computer readable medium that, when executing on a computer, performs steps comprising:
 a) entering business function parameters and limiting parameters of the said business function parameters through an input interface;
 b) tracking the said entered business function parameters for any change in the said business function parameters by a tracking sub-system;
 c) calculating the impact by an impact calculator of a change in the said business function parameters if the said business function parameters cross the limits defined by the said limiting parameters; and
 d) conducting a business impact analysis in real time and generating a business impact analysis report based on factors such as but not limited to said business function parameters, change occurred, impact calculation calculated by the said impact calculators or, any other combinations thereof.

Another preferred embodiment of the invention provides a computer program product for business impact analysis and disaster recovery, the computer program product embodied in a computer readable medium that, when executing on a computer, performs steps comprising:
 a) entering business function parameters and limiting parameters of the said business function parameters through an input interface;
 b) tracking the said entered business function parameters for any change in the said business function parameters by a tracking sub-system;
 c) calculating the impact by an impact calculator of a change in the said business function parameters if the said business function parameters cross the limits defined by the said limiting parameters;
 d) conducting a business impact analysis in real time and generating a business impact analysis report based on factors such as but not limited to said business function parameters, change occurred, impact calculation calculated by the said impact calculators or, any other combinations thereof; and
 e) automating a disaster recovery procedure by collecting of data from the step of conducting a business impact analysis in real time and generating a business impact analysis report and feeding said data as in-bound dependencies and out-bound dependencies, down-time that a specific application can afford and impact of non-availability of application, based on which the automating a disaster recovery procedure is enabled by a disaster recovery automating engine.

In an embodiment of the invention, the system further comprises of a "Query Engine module" which starts a handshake with one or more servers and collects information about the state of the Information Technology infrastructure at both Production and Data Recovery sites.

In an embodiment of the invention, the Query engine module verifies and validates the BIA inputs as per the handshake mechanism. Once the validation process is completed and found correct, the process continues to monitor the respective application with the given data, wherein an exemplary mechanism of handshake involves reaching an IP address of a specific application. If the IP address of the specific application is not reached beyond the configured threshold, the process triggers an alert to get generated and pops-up on the screen with a message that the application is down and also show the associated potential impacts. It also tells that the other impacts of in-bound and out-bound dependent applications associated with the specific application, as per the collected data. Similarly, if the inter-dependent application IP addresses are not able to be reached beyond the configured threshold, it triggers similar alerts and notifies the users. Apart from the screen messages, alerts will also go to configured users by one or more communication modes such as but not limited to sending as SMS or an Email or a combination thereof. On notifying the users, the system waits for the user to respond to the alert by opening the alert message and type the action that is being initiated and the alert should be turned to 'closed' state. The wait period to react to the alert is defined during the data collection stage. If the alert ticket is not closed by the user within the configured threshold, the system assumes the problem is unresolved and further notifies the next level of configured users as per the escalation matrix with the impact analysis outcome and also suggest to get the Failover triggered quickly to move to DR site.

In an embodiment of the invention, a computer program product residing on a machine readable medium may provide or enable access to systems and methods for business impact analysis and disaster recovery, wherein the computer program product is tangibly stored on machine readable media.

In an embodiment of the invention, MTPoD (Maximum Tolerable Period of Disruption) real-time values can be calculated based on a business impact analysis report and the MTPoD may be displayed on a dashboard In an embodiment of the invention, vendor APIs are integrated as Libraries within the system of the present invention in a storage device, in the form of dynamic workflows to execute the sequence of any activity like Data Recovery drills, real-time failover and other tests.

In an embodiment of the invention, it may be required that the electronic device be registered or indexed with the system of the present invention. As an addition or alteration to this embodiment, it may be required that the electronic device may meet certain predetermined parameters such as but not limited to having licensed version of software or operating system of the device, or an original device itself.

In an embodiment of the invention, multiple devices can be registered or indexed in accordance with the present invention, and one or more of these devices can be used either individually or in combination thereof for using the systems and methods of the present invention.

FIG. 1 represents an exemplary flow chart of one of the embodiments of the invention, which comprises of the following steps:

Step 1—Enter the data in BIA form;
Step 2—Monitor health of DR Infrastructure;
Step 3—Check 'Is Health of DR infrastructure component in good condition?';
Step 4—Check for the Production and DR Storage arrays;
Step 5—Check 'Is Health of DR storage arrays in good condition?';
Step 6—BIA IMPACTED and there is a need to take further action based on the BIA Impact analysis & assessment action plan;
Step 7—Check for the DB servers;
Step 8—Check 'Is Health of DB servers in good condition?';
Step 9—Check for the DB servers;
Step 10—Check 'if DB instances running?';
Step 11—Check for the Replication connectivity links;
Step 12—Check 'Replication links are working?';
Step 13—Check 'if Data available at DR is of more than 2 hours?';
Step 14—Check for the Application server status;
Step 15—Check 'Is any application server down?';
Step 16—Check 'will this application work from any other alternate server?';

With the following conditions:
a) if output of step 3 is 'yes' then step 4 occurs, or else step 6 occurs;
b) if output of step 5 is 'yes' then step 7 occurs, or else step 6 occurs;
c) if output of step 8 is 'yes' then step 9 occurs, or else step 6 occurs;
d) if output of step 10 is 'yes' then step 11 occurs, or else step 6 occurs;
e) if output of step 12 is 'yes' then step 14 occurs, or else step 13 occurs;
f) if output of step 13 is 'yes' then step 6 occurs, or else step 14 occurs;
g) if output of step 15 is 'yes' then step 16 occurs, or else step 2 occurs;
h) if output of step 16 is 'yes' then step 2 occurs, or else step 6 occurs;

In an embodiment of the invention, terms "real time", "realtime" or "real-time" means instantly or within a time span of less than five minutes or fast enough to respond to someone or something that is waiting for the information.

A user is any person, machine or software that uses or accesses one or more of the systems or methods of the present invention. A user includes an automated computer program and a robot.

In an embodiment of the invention, the said code may have a combination of numeric or alphanumeric or symbolic characters used for protected and restricted access provided to a user to one or more digital systems or function or data, provided after necessary authentication or identification of the user.

In an embodiment of the invention, the systems and methods can be practised using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, portable media players and personal digital assistants.

In an embodiment of the invention, the systems and methods of the present invention may be enabled through a computer program product which may be embodied in a computer.

The present invention in an embodiment provides for a computer program product embodied in a computer readable medium that enables systems and methods for business impact analysis and disaster recovery.

In an embodiment of the invention, one or more user can be blocked or denied access or be required to reattempt access, to one or more of the aspects of the invention.

In an embodiment of the invention, a user may have a system to record or send alert or be informed in case any other user is accessing the user's electronic device remotely.

In an embodiment of the invention, the systems and methods of the invention may simultaneously involve more than one user or more than one data storage device or more than one host server or any combination thereof.

In an embodiment of the invention, the systems and methods of the present invention are used to prevent or restrict hacking or related phenomenon such as but not limited to phishing, man in the middle attack, inside jobs, rogue access points, back door access, use of viruses and worms, use of Trojan horses, denial of service attack, sniffing, spoofing, ransomware or any combination thereof.

In an embodiment of the invention, a user may enter or communicate data or request through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick.

In an embodiment of the invention, the systems and methods of the present invention provides or enables a user interface which may allow commands for a command line interface or a graphical user interface (GUI) enabling a user to create, modify and delete data or metadata or program or logic or algorithm or parameters associated with encryption method or encryption program or encryption language.

In an embodiment of the invention, the systems and methods can be practised using any electronic device which may be connected to one or more of other electronic device with wires or wirelessly which may use technologies such as but not limited to, Bluetooth, WiFi, Wimax. This will also extend to use of the aforesaid technologies to provide an authentication key or access key or electronic device based unique key or any combination thereof.

In an embodiment of the invention, the systems and methods can be practised using any electronic device which may contain or may be infected by one or more of an undesirable software such as but not limited to a virus, or a Trojan, or a worm, malware, spyware, adware, scareware, crimeware, rootkit or any combination thereof.

In an embodiment of the invention, the system may involve software updates or software extensions or additional software applications.

In an embodiment of the invention, any form of internet security such as but not limited to, a firewall or antivirus or antimalware or registry protection can be used by a user in the same or different electronic device either simultaneously or separately, along with the systems or methods of the present invention.

In an embodiment of the invention, one or more user can be blocked or denied access to one or more of the aspects of the invention.

The described embodiments may be implemented as a system, method, apparatus or article of manufacture using standard programming or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, computer program code for carrying out operations or functions or logic or algorithms for aspects of the present invention may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic .NET, Visual C++, Visual C# .Net, Python, Delphi, VBA, Visual C++ .Net, Visual FoxPro, YAFL, XOTcl, XML, Wirth, Water, Visual DialogScript, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective Caml, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Icl, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, Caml, Blue, Bistro, Bigwig, BETA, Befunge, BASIC, Awk, Assembly, ASP, AppleScript, APL, Algol 88, Algol 60, Aleph, ADL, ABEL, ABC, or similar programming languages.

In an embodiment, one or more data storage unit or data storage device is used in the system of the present invention, wherein the data storage unit is selected from a set of but not limited to USB flash drive (pen drive), memory card, optical data storage discs, hard disk drive, magnetic disk, magnetic tape data storage device, data server and molecular memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude or rule out the presence or addition of one or more other features, integers, steps, operations, elements, components, or groups thereof.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

In an embodiment of the invention, the term network means a system allowing interaction between two or more electronic devices, and includes any form of inter/intra enterprise environment such as the world wide web, Local Area Network (LAN), Wide Area Network (WAN), Storage Area Network (SAN) or any form of Intranet.

We claim:

1. A system for business impact analysis and disaster recovery, wherein the system comprises:
a storage device;
a processor coupled with the storage device;
an input device;
a tracking sub-system coupled to the processor, and being responsive to the processor to independently or simultaneously track business function parameters for any change at one of an operation site and a disaster recovery site, said tracking sub-system being operatively coupled with a query engine module that starts a handshake with one or more servers at one of the operation site and the disaster recovery site;
an input interface of the input device coupled to the processor to input the business function parameters and limiting parameters of said business function parameters, wherein said limiting parameters defines limits of said business function parameters and are associated to the said business function parameters, and wherein the business function parameters and limiting parameters are stored in the storage device, and wherein the business function parameters are configured to collect information about the state of the infrastructure at either the operation site and/or the disaster recovery site to:
(i) determine health of disaster recovery storage arrays;
(ii) upon the condition that the disaster recovery storage arrays are healthy,
determine presence of and health of database servers;
(iii) upon the condition that the database servers are healthy, determine whether database instances are running;
(iv) upon the condition that the database instances are running, check for replication connectivity links and determine whether the replication connectivity links are working; and
(v) upon the condition that the replication connectivity links are working, determine status of application servers; and an impact calculator coupled to the processor and the tracking sub-system so as to get triggered for calculating impact of change in said business function parameters in real time at one of the operation site and the disaster recovery site connected by a network, said impact calculator being triggered upon occurrence of a change in business function parameters that cross the limits defined by the said limiting parameters and upon being tracked by said tracking sub-system, wherein the tracking sub-system, being responsive to the processor, automatically creates event rules based on an algorithm and comparison matrix to trigger the impact calculator;
wherein the system conducts the business impact analysis in real time for generating a business impact analysis report based on factors selected from any or a combination of said business function parameters, change occurred in said business function parameters, and impact calculated by said impact calculator, wherein based on the business impact analysis, the system being responsive to the processor to:
perform an assessment action plan of generating an alert message along with the impact analysis report to be transmitted and displayed on a user's electronic device screen,
wait for the user to respond to the alert message, wherein the user is able to respond by opening the alert message, typing an action that is being initiated, and turning the alert to a closed state, such that if the alert is not turned to closed stated by the user within a configured threshold, assume that problem is unresolved and further notify a next level of configured users as per an escalation matrix with the impact analysis report, and a suggestion to get failover triggered quickly to move the business function parameters from the operating site to the data recovery site.

2. The system for business impact analysis and disaster recovery as claimed in claim 1, wherein the limiting parameter of a business function parameter is selected from any or a combination of an upper limit, a lower limit or the combination of both, or wherein the limiting parameter is a fixed value.

3. The system for business impact analysis and disaster recovery as claimed in claim 1, wherein the business function parameter is selected from any or a combination of total revenue, number of employees, number of customers, capital available, total liquid cash available, plan development costs, PC business recovery software costs, subscription costs for recovery processing, declaration fees, usage fees, testing, temporary location costs, administrative time, management time, redundancy costs, prevention or preparation costs, insurance costs, consulting costs, relocation costs, travel expenses.

4. The system for business impact analysis and disaster recovery as claimed in claim 1, wherein the impact calculator calculates the impact on any suitable business factor selected from any or a combination of customer service, non compliance with government regulations, non compliance with existing contracts, increase in personnel requirements, loss of revenue, loss of business, increased operating costs, penalties, loss of financial management capability, loss of competitive edge, loss of goodwill, negative media coverage, loss of stockholder confidence, legal actions.

5. A method for business impact analysis and disaster recovery, wherein the method comprises steps of:
a) tracking, through a tracking sub-system that is coupled to the processor, business function parameters for any change at one of an operation site and a disaster recovery site, said tracking sub-system being operatively coupled with a query engine module that starts a handshake with one or more servers at one of the operation site and the disaster recovery site;
b) entering, through an input interface of an input device, the business function parameters and limiting parameters of the said business function parameters wherein said limiting parameters defines limits of said business function parameters and are associated to the said business function parameters, and wherein the business function parameters and limiting parameters are stored in the storage device, and wherein the business function parameters are configured to collect information about the state of the infrastructure at either the operation site and/or the disaster recovery site to:
(i) determine health of disaster recovery storage arrays;
(ii) upon the condition that the disaster recovery storage arrays are healthy, determine presence of and health of database servers;
(iii) upon the condition that the database servers are healthy, determine whether database instances are running;
(iv) upon the condition that the database instances are running, check for replication connectivity links and determine whether the replication connectivity links are working; and
(v) upon the condition that the replication connectivity links are working, determine status of application servers;
c) calculating the impact by an impact calculator of a change in said business function parameters if said business function parameters cross the limits defined by the said limiting parameters and upon being tracked by said tracking sub-system, wherein the tracking sub-system, being responsive to the processor, automatically creates event rules based on an algorithm and comparison matrix to trigger the impact calculator;
d) conducting a business impact analysis in real time to generate, a business impact analysis report based on factors selected from any or a combination of said business function parameters, change occurred in said business function parameters, and impact calculated by said impact calculator;
e) based on the business impact analysis, performing an assessment action plan of generating an alert message along with the impact analysis report to be transmitted and displayed on a user's electronic device screen;
f) waiting for the user to respond to the alert message, wherein the user is able to respond by opening the alert message, typing an action that is being initiated, and turning the alert to a closed state; and
g) if the alert is not turned to closed stated by the user within a configured threshold, assuming that problem is unresolved and further notify a next level of configured users as per an escalation matrix with the impact analysis report, and a suggestion to get failover triggered quickly to move the business function parameters to the data recovery site.

6. The method for business impact analysis and disaster recovery as claimed in claim 5, further comprising the step of automating a disaster recovery procedure by collecting of data from the step of conducting the business impact analysis in real time and feeding said data as in-bound dependencies and out-bound dependencies, down-time that a specific application is able to afford and impact of non-availability of said specific application, based on which automation of disaster recovery procedure is enabled by a disaster recovery automating engine.

7. The method for business impact analysis and disaster recovery as claimed in claim 5, wherein the impact calculator calculates the impact on any suitable business factor selected from any or a combination of customer service, non compliance with government regulations, non compliance with existing contracts, increase in personnel requirements, loss of revenue, loss of business, increased operating costs, penalties, loss of financial management capability, loss of competitive edge, loss of goodwill, negative media coverage, loss of stockholder confidence, legal actions.

8. A non-transitory computer program product for business impact analysis and disaster recovery, the non-transitory computer program product comprising instructions executable by a processor of a system for:
a) tracking, through a tracking sub-system that is coupled to the processor, business function parameters for any change at one of an operation site and a disaster recovery site, said tracking sub-system being operatively coupled with a query engine module that starts a handshake with one or more servers at one of the operation site and the disaster recovery site;
b) entering, through an input interface of an input device, the business function parameters and limiting parameters of the said business function parameters wherein said limiting parameters defines limits of said business function parameters and are associated to the said business function parameters, and wherein the business function parameters and limiting parameters are stored in the storage device, and wherein the business function parameters are configured to collect information about the state of the infrastructure at either the operation site and/or the disaster recovery site to:
(i) determine health of disaster recovery storage arrays;
(ii) upon the condition that the disaster recovery storage arrays are healthy, determine presence of and health of database servers;
(iii) upon the condition that the database servers are healthy, determine whether database instances are running;
(iv) upon the condition that the database instances are running, check for replication connectivity links and determine whether the replication connectivity links are working; and
(v) upon the condition that the replication connectivity links are working, determine status of application servers;
c) calculating the impact by an impact calculator of a change in said business function parameters if said business function parameters cross the limits defined by the said limiting parameters and upon being tracked by said tracking sub-system, wherein the tracking sub-system, being responsive to the processor, automatically creates event rules based on an algorithm and comparison matrix to trigger the impact calculator;
d) conducting a business impact analysis in real time to generate, a business impact analysis report based on factors selected from any or a combination of said business function parameters, change occurred in said business function parameters, and impact calculated by said impact calculators;
e) based on the business impact analysis, performing an assessment action plan of generating an alert message along with the impact analysis report to be transmitted and displayed on a user's electronic device screen;

f) waiting for the user to respond to the alert message, wherein the user is able to respond by opening the alert message, typing an action that is being initiated, and turning the alert to a closed state; and g) if the alert is not turned to closed stated by the user within a configured threshold, assuming that problem is unresolved and further notify a next level of configured users as per an escalation matrix with the impact analysis report, and a suggestion to get failover triggered quickly to move the business function parameters to the data recovery site.

9. The non-transitory computer program product for business impact analysis and disaster recovery as claimed in claim 8 further comprising instructions of collecting data from the step of conducting the business impact analysis in real time and feeding said data as in-bound dependencies and out-bound dependencies, down-time that a specific application is able to afford and impact of non-availability of the specific application, based on which automation of disaster recovery procedure is enabled by a disaster recovery automating engine.

\* \* \* \* \*